United States Patent [19]

Inagami et al.

[11] Patent Number: 4,691,011

[45] Date of Patent: Sep. 1, 1987

[54] WATER-DISPERSIBLE HYDROPHILIC MILK PROTEIN PRODUCT

[75] Inventors: Kaoru Inagami, Tokyo; Noboru Kikuchi, Kawasaki, both of Japan

[73] Assignee: The Calpis Food Industry Co., Ltd., Japan

[21] Appl. No.: 809,569

[22] Filed: Dec. 16, 1985

[30] Foreign Application Priority Data

Dec. 24, 1984 [JP] Japan .................................. 59-270709

[51] Int. Cl.$^4$ .............................................. A23C 9/12
[52] U.S. Cl. ..................................... 530/832; 530/833
[58] Field of Search ................................ 530/832, 833

[56] References Cited

U.S. PATENT DOCUMENTS 2,750,374  6/1956  Howard et al. ..................... 530/832

FOREIGN PATENT DOCUMENTS

54/20169  7/1977  Japan .

Primary Examiner—John Kight
Assistant Examiner—Nathan M. Nutter
Attorney, Agent, or Firm—Darby & Darby

[57] ABSTRACT

According to the invention, a milk protein product is provided. The milk protein product has water-dispersible and hydrophilic properties and contains substantially no serum. The milk protein product is obtained by coagulating milk under a flowing condition at a predetermined pH-temperature range to obtain a coagulum and then separating the coagulum.

17 Claims, 2 Drawing Figures

WATER-DISPERSIBLE HYDROPHILIC MILK PROTEIN PRODUCT

BACKGROUND OF THE INVENTION

1. Field of the Invention

The present invention relates to a milk protein product, and more particularly to a milk protein product having water-dispersible and hydrophilic properties.

2. Related Art Statement

Sodium caseinate is milk protein which has been known as having excellent water-dispersible and hydrophilic properties.

Although sodium caseinate is easily dissolved in water to exhibit strong adhesion, it has off flavour due to alkali and contains a large amount of binding sodium since it is produced by processing the milk protein with a strong alkali, such as sodium carbonate.

For this reason, addition of sodium caseinate to foodstuff is limited, to avoid excess intake of sodium, generally to a level of about 0.2 to 0.5 wt%. It is necessary that an orally-administered liquid diet must contain 3 to 5 wt% of protein. However, the necessary content of protein cannot be supplied by the only use of sodium caseinate. Accordingly, soybean protein is used together with sodium caseinate to prepare such an orally-administered liquid diet at the present time.

Milk protein products, other than sodium caseinate, known in the art include acid casein, rennet casein and co-precipitation milk proteins. Acid casein is prepared by adding an acid to milk to adjust a pH value of milk to pH 4.3 to 4.8 thereby to precipitate casein. However, the acid casein is inferior in hydrophilic property, and cannot be dissolved without the use of strong acidic or alkaline water. For this reason, the acid casein is rarely used in foodstuff, but is dissolved in a strong alkaline liquid to be used for industrial applications as adhesives or paper coating agents.

It is considered that intensive electrostatic interaction takes place among protein molecules together with formation of hydrophobic bondings during the acid precipitation process. It is known that the proteins linked by strong intermolecular bondings are not dispersed in water unless the water is strongly acidic or alkaline.

On the other hand, rennet casein is prepared by heating skim milk at 30° to 37° C., adding with rennin and coagulating in the presence of calcium ions, so that the major portion of protein binds with calcium. Thus, it is inferior in hydrophilic property. The rennet casein is used mainly as a plastics molding material for the production of buttons or the like, although a trial has been made to use the same for a cheese analogue. The co-precipitation protein product is prepared by adding calcium chloride to milk, followed by heating to 90° to 95° C., to co-precipitate casein with whey protein. Since the co-precipitation protein product is mainly composed of protein bound with calcium, it cannot be dispersed in water unless it is processed by the addition of 2 to 6 wt% of sodium polyphosphate. The products obtained by the enzymatic precipitation by rennin in the presence of calcium ions or by the co-precipitation by the use of calcium chloride are composed of proteins bound with calcium and are not expected to have water-dispersible and hydrophilic properties.

On the other hand, Japanese Patent Laid-Open Publication No. 20169/1979 filed by the assignee of this application proposes a process wherein milk is heated at pH 5.2 to 5.9 to a temperature of 50° to 90° C. under a static condition without being vibrated to prepare a soft curd edible diet of custard-like form. The edible diet obtained by this process is prepared by solidification of milk in its entirety in the form of custard-like curd containing milk protein and serum. Fox (P. F. Fox: Developments in Dairy Chemistry-I Proteins, p212, 1982, Applied Science Publishers) has reported that raw milk is coagulated by raising the temperature thereof by heating at pH 5.5 to 66° C. under a static condition. However, this report only describes the physical change of the milk.

OBJECTS AND SUMMARY OF THE INVENTION

A primary object of this invention is to provide a novel milk protein product which has water-dispersible and hydrophilic properties.

Another object of this invention is to provide a milk protein product which is hydrophilic and dispersible stably in water for a long period of time and has good flavor and taste without off flavor due to alkali.

A further object of this invention is to provide a milk protein product which has an adhesive property together with the water-dispersible and hydrophilic properties to be used as a novel food material resembling processed cheese or to be used as an adhesive in the production of livestock products or aquatic paste products.

A still further object of this invention is to provide a milk protein product which has good amino acid balance and water-dispersible and hydrophilic properties to be used for nutritional high protein foods, tube and orally administered liquid diets or other applications.

Yet a further object of this invention is to provide a milk protein product having water-dispersible and hydrophilic properties, which is free of lactose to be used as a law lactose dairy food.

An additional object of this invention is to provide a milk protein product having water-dispersible and hydrophilic properties, which may be added to bakery products.

The above and other objects of this invention will become apparent from the following description of the invention.

According to the invention, there is provided a milk protein product having water-dispersible and hydrophilic properties and containing substantially no serum, the milk protein product being obtained by a process comprising the steps of:

(a) coagulating milk under a flowing condition and at a pH-temperature area surrounded by linear lines represented by the following equations A to F where a pH-temperature relation is shown on co-ordinates, a centigrade temperature being on an ordinate and a pH value being on an abscissa;

A: $y = 52.3x - 247$
B: $y = 38$
C: $x = 5.10$
D: $y = 60x - 244$
E: $y = 86$
F: $x = 6.10$ to thus obtain a coagulum; and (b) separating the coagulum.

DESCRIPTION OF THE INVENTION

In the course of various investigations, we have fixed our eyes upon the facts that the properties of milk protein are significantly affected by the pH value and the temperature and that unexpected changes in properties are resulted by physical processing of the milk protein. We have further investigated and finally found that the coagulated protein product obtained by coagulating milk under a flowing condition and at a certain pH-temperature area, followed by separation, has surprisingly high water-dispersible and hydrophilic properties. The present invention is accomplished on the basis of this unexpected finding. More particularly, this invention is characterized by denaturation of milk protein which is effected by processing milk under a flowing condition and at a certain pH-temperature area, as defined in the claims, until the milk protein has been completely separated from serum. It is ascertained that the milk protein product, according to the present invention, comprises substantially pure milk protein containing substantially no serum. The phrase "containing substantially no serum" used throughout the specification and claims means that the milk protein product of the invention is essentially consisting of a coagulum and includes a coagulum attached with more or less serum; and the term "hydrophilic" means the property to be bound with water, in other words, means that the product is easily wetted by water.

The raw material used in the present invention includes normal milks containing fats, partially or completely defatted skim milks, and reconstituted milks prepared by suspending whole milk powders or skim milk powders in water. The term "milk" used throughout the specification and claims includes the aforementioned variety of milks.

When the concentration of milk is too high, it might become difficult to separate the milk protein product of the invention and the purity of the milk protein product could be lowered. On the contrary, if the concentration is too low, coagulation might hardly take palce or the yield of the milk protein product could be lowered. Taking the operation efficiency and yield into consideration, it is desirous that the concentration of milk ranges from 3 to 15 w/w%, preferably from 5 to 10 w/w%, based on the solid non-fat content. Fresh milk has a pH value of from 6.40 to 6.80.

Figure 1:
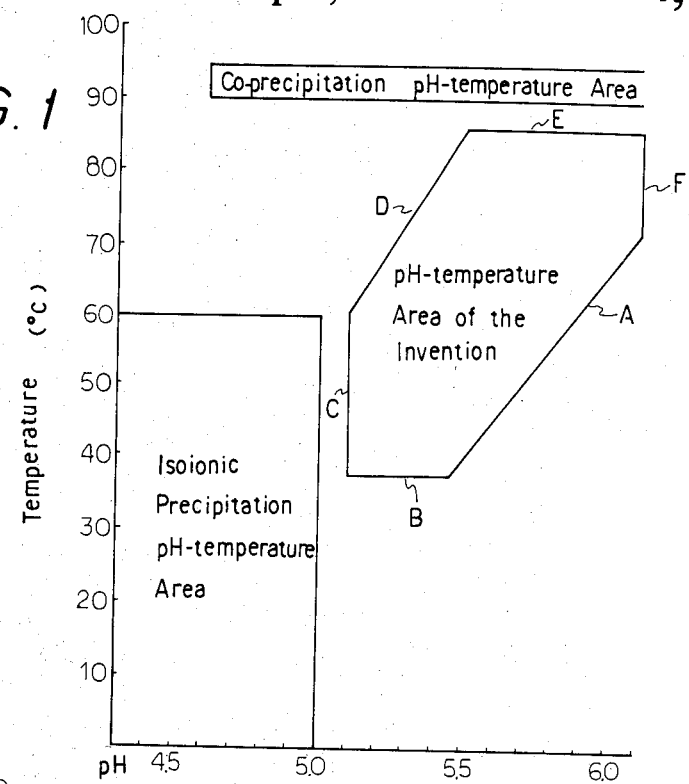
FIG. 1 is a diagram showing the pH-temperature area at the step of coagulating the milk protein product having water-dispersible and hydrophilic properties according to the invention.

It is essential in the present invention that the pH-temperature relation of the milk should be within the area surrounded by the lines A, B, C, D, E and F in FIG. 1 when the pH-temperature relation is shown on co-ordinates. This area has been defined empirically by conducting many experiments by changing the used milks and acids and by varying the temperature of the milks containing the added acids. Plotting the pH value (at 25° C.) of milk on the abscissa x and plotting the centigrade temperature (°C.) on the ordinate y, the line A is a linear line represented by $y=52.3x-247$, B is a linear line represented by $y=38$, C is a linear line represented by $x=5.10$, D is a linear line represented by $y=60x-244$, E is a linear line represented by $y=86$, and F is a linear line represented by $x=6.10$.

The area surrounded by the linear lines A, B, C, D, E and F was found as the pertinent pH-temperature area by the following experiments.

Ten test fractions each having a variant pH value of from pH 5.00 to pH 6.20 were prepared by slowly adding a 0.15 Normal aqueous citric acid solution under agitation to commercially available milk containing about 3.3% of fat and stored for 2 days under chilled condition. Water was then added to the test fractions so that the volume of each test fraction was equalized with that having a pH value of 5.00. After allowing to stand for about an hour at 10° C., precipitations were found in the test fractions having pH values of less than pH 5.10, and the precipitated proteins were inferior in water-dispersible and hydrophilic properties. The test fractions each having a pH value of less than 5.10 were thus judged as impertinent. The test fractions each having a pH value of not less than 5.10 were heated under agitation to raise the temperatures thereof, whereupon coagula were formed. The temperatures of the test fractions in which coagula were formed were measured. No coagulum was formed in the test fractions each having a pH value of more than 5.80 to fail to obtain milk protein products effectively by heating. The test fractions each having a pH value of more than 5.80 were thus judged as impertinent. The pH-temperature relations for forming the coagula measured in respective test fractions having pH values of from pH 5.10 to pH 5.80 were plotted in FIG. 2 to find that the pH-temperature relations were on the line a represented by an equation of the first degree. However, a single line a was not drawn for a variety of milks, with the line moved toward the line D substantially parallel to the line a for milk containing an increased amount of fat and the line moved toward the line A substantially parallel to the line a for milk containing a decreased amount of fat. It was also observed that the line for cultured milk, milk stored for a long time or milk stored in a frozen condition was moved toward the line D. Similarly, fresh skim milk (stored for two days after being defatted and containing not more than 0.1 wt% of fat) was added with a 0.15 Normal aqueous citric acid solution to prepare test fractions each having a variant pH value, which were used to learn the pH-temperature relation, whereby the linear relation generally aligning on the line b was obtained. Likewise in cases plotted on the line a, the test fractions plotted on the line b but outside of the lines E and C were inferior in water-dispersible and hydrophilic properties. The same skim milk was stored at 5° C. for 12 days, followed by adjusting the pH value to prepare another test fractions which were used to learn the pH-temperature relation to obtain the line c which was positioned closer to the line D than the line b. Commercially available skim milk was suspended in distilled water, added with a 0.15 Normal aqueous citric acid solution to prepare a series of test fractions which were added with water to adjust the solid milk content thereof to 8 w/w%, and used for the determination of the pH-temperature relation similarly as in the preceding procedure, whereby the line d was obtained. The same reconstituted skim milk was added with 0.15 Normal hydrochloric acid to prepare another series of test fractions which were used to learn the pH-temperature relation similarly, whereby the the line e was obtained. The same reconstituted skim milk was heated to different temperatures of from 38° C. to 86° C., and added slowly with a 0.15 mol aqueous solution of glucono-δ-lactone to learn the pH-temperature relation at which coagulation was observed, whereby the line f was obtained.

The same fresh milk used in the test for obtaining the line a was inoculated with 3 w/w% of a yogurt starter (a mixed starter containing L. bulgaricus, S. Lactis and S. cremoris) and cultured at 37° C. for 2.0 to 4.0 hours, whereby cultured milk test fractions each having a variant pH value of from pH 5.10 to pH 6.10 were prepared. The cultured milk test fractions were heated immediately after the preparation of the test fractions to learn the pH-temperature relation, whereby the line g was obtained.

To summarize, as to the pH-temperature relation for inducing coagulation of milk protein, the following facts have been discovered by the present invention.

(1) The pH-temperature relations measured are plotted on a substantially linear line having a gradient approximate to that of line A or D, with the lines positioned closer to the line D resembling the letter S more or less.

(2) As the milk is preliminarily heated, i.e. the protein therein is subjected to heat-induced denaturation, the line indicating the pH-temperature relation tends to move to a position closer to the line A.

(3) The line indicating the pH-temperature relation is moved depending on the kind of acids used for adjusting the pH value.

(4) The line indicating the pH-temperature relation is moved to a position closer to the line A when the concentration of milk is high, and moved to a position closer to the line D when the concentration of milk is low.

(5) The line indicating the pH-temperature relation is moved closer to the line D, as the content of fat is increased.

It has been also ascertained by the experiments that the lines indicating the pH-temperature relations utilizable effectively in the present invention are included in the area surrounded by the lines A, B, C, D, E and F in FIG. 1. This area defined by the present invention is different from the pH-temperature area for the production of acid casein, namely the area defined by a pH range of from pH 4.2 to pH 5.0 and a temperature range of from 26° C. to 60° C. (see FIGS. 1 and 2). The range defined by the present invention is also different from the area for the production of conventionally known co-precipitation milk protein, namely the area defined by a pH range of from pH 4.6 to pH 5.9 and a temperature range of from 90° C. to 95° C. (see the aforementioned reference by Fox, pages 328 to 330).

In the present invention, it is essential that the milk is coagulated within the pH-temperature area surrounded by the linear lines A to F, as shown in FIG. 1, under a flowing condition. If the milk is coagulated under a static condition rather than a flowing condition, the milk protein product having water-dispersible and hydrophilic properties cannot be separated. It was surprising that a milk protein product of high purity having water-dispersible and hydrophilic properties and containing substantially no serum was prepared by processing the milk under a flowing condition. The processing under a flowing condition provides another merit that the temperature and the pH value of the milk are maintained uniformly in its entirety.

It is desirous that the milk is flowed at a flow rate of at least 2 cm/sec, preferably not less than 10 cm/sec, more preferably not less than 100 cm/sec. If the flow rate is less than 2 cm/sec, a soft curd product is formed, or the content of serum in the product is increased, or a protein product having a localized portion which is inferior in water-dispersibility is formed. The upper limit of the flow rate is not particularly critical, but no further advantage is obtainable as the flow rate is increased excessively with unfavorable increase in energy cost for increasing the flow rate. The milk may be flowed by any means, for example, it may be agitated by a stirrer provided with propeller blades, recirculated by the use of a pump, or vibrated by a vibrator.

In order to raise the temperature of the milk within the defined range, the milk may be heated directly or may be indirectly heated using a heat exchanger. The milk may be heated simultaneously with the adjustment of the pH value, or may be heated prior to or after the adjustment of the pH value.

It is desirous that the pH value of the milk is adjusted by adding an aqueous solution of an acid or a salt of acid, or by cultivating the milk after being inoculated with a microorganism, such as lactic acid bacteria. Preferred acids and/or salts thereof used in the pH value adjusting aqueous solutions include acetic acid, citric acid, lactic acid, adipic acid, tartaric acid, malic acid, fumaric acid, sodium fumarate, gluconic acid, ethylenediaminetetraacetic acid, phosphoric acid, hydrochloric acid, sulfuric acid, glucono-δ-lactone and salts thereof. It is preferred that a dilute acid solution is added, in order to obviate the formation of acid casein due to excessive drop of the pH value which might occur by the addition of concentrated acid solution. For the convenience of opertion, it is preferred that an aqueous acid solution of 1.0 Normal or lower be used. The aqueous acid solution should be added to the milk while allowing to flow the milk, in order to disperse the acid rapidly in the milk so that the pH value of the milk is uniformly lowered without lowering the pH value of any localized portion excessively.

The milk may be brought into the area surrounded by the lines A, B, C, D, E and F shown in FIG. 1 by the method wherein the temperature of the milk is first raised to a temperature within the defined temperature range, and then an aquesous acid solution is slowly added to adjust the pH value within the defined range, or by the method wherein an aqueous acid solution is added to the milk at the room temperature to adjust the pH value thereof within the defined pH range and then the milk having the adjusted pH value is heated to a temperature within the defined temperature range. The first mentioned method may be combined with the last mentioned method. In detail, the both methods may be combined such that the milk is added with an aquesous acid solution to have a pH value within the defined range at room temperature (the pH range shown in FIG. 1), then the milk is heated to a temperature which is slightly lower than the expected coagulation temperature which has been found by the preliminary tests, and thereafter an additional amount of aqueous acid solution is added with care while maintaining the milk under a flowing condition to coagulate the protein. Another combined method comprises a first step of adding an aqueous acid solution to milk at room temperature to have a pH value within a range of around pH 6.10 to 5.60, a step of heating the milk to a temperature slightly lower than the temperature at which coagulation takes place, and a final step of adding an additional aqueous acid solution to lower the pH value to coagulate the protein. According to the last mentioned method, an inexpensive inorganic acid or a concentrated acid solution may be used at the first step and an organic acid or a dilute acid solution may be used at the final step of adding an additional aqueous acid solution, whereby the process becomes economical and mild. Alternatively, the milk is inoculated with lactic acid bacteria, followed by cultivation, to have a pH value within the defined range, and then cultured milk is heated to coagulate the protein.

Figure 2:
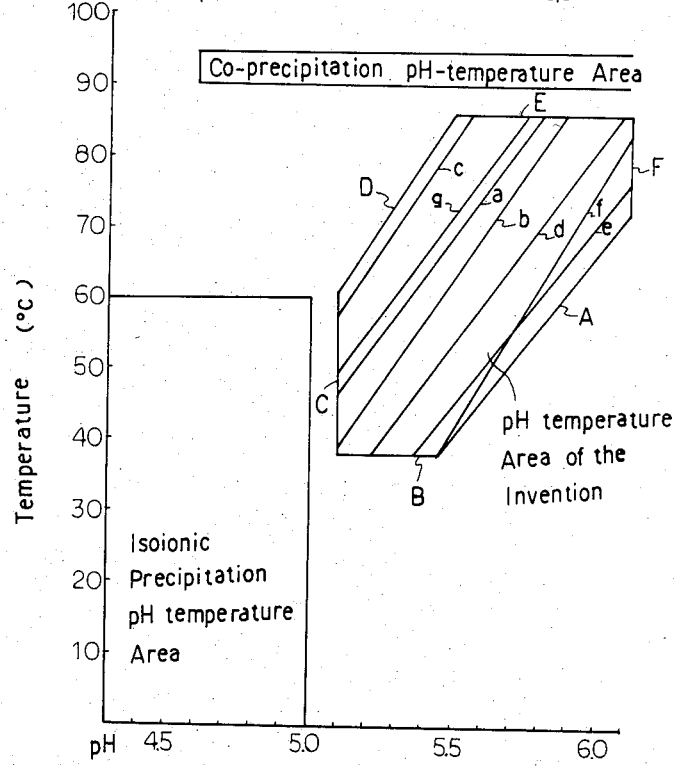
FIG. 2 is a diagram showing the interrelations between the pH value and the temperature when various milks and various aqueous acid solutions are used.

The pH value of the milk is adjusted or the temperature of the milk is raised until coagulation of protein takes place. If the same milk is used and coagulation is effected using the same acid by the same method, it is convenient to plot a line indicating the pH-temperature relation as shown in FIG. 2 by conducting preliminary experiments to anticipate the termination of the pH adjusting step or the heating step.

The pH value or the temperature at which coagulation takes place varies depending on the kinds of milks and acids within the area surrounded by the lines A, B, C, D, E and F shown in FIG. 1. In other words, the different oblique coagulation lines such as lines a, b, c, d, e, f and g are obtained depending on the combination of the used milk and acid. It is, therefore, recommended to anticipate the specific pH value or temperature by preliminary experiments conducted by the use of the specific combination of milk and acid.

The coagulation as herein described in the present invention means the phenomenon wherein a portion of initially milky liquid changes into feeble yellow serum, with the simultaneous formation of fibrous or cloudy coagulum, which spreads over the entire liquid. When it is felt difficult to judge the initiation of coagulation, a portion of the processed liquid may be taken into a test tube and allowed to stand still so that the coagulum precipitates downwardly to leave the yellow serum at the upper portion of the test tube to facilitate easy inspection. If it is judged that sufficient coagulation has not occurred, when observed through the test tube inspection, the temperature of the milk is further raised or the pH value of the milk is lowered by the addition of an acid to coagulate the protein fully. However, care must be paid neither to raise the temperature nor to lower the pH value excessively, since the water-dispersible property and the hydrophilic property of the milk protein product are adversely affected by such an excess processing. It has been ascertained by experiments that the tolerable excess temperature raise is not more than 10° C. at the most and preferably not more than 5° C., and that the tolerable excess pH drop is not more than 0.20 at the most and preferably not more than 0.10. After the condition for complete coagulation is established, the addition of the acid solution or the temperature raising operation is stopped immediately and the liquid is held at that condition, whereby small coagulated protein particles associate to form granules. The time for holding the liquid is not critical. Although the cooling temperature is not critical, it is preferable to cool the system at a temperature of not higher than 40° C. prior to the step of separating the coagulum.

The coagulum may be separated by any known means, for example, by means of filtration or centrifugal separation. By way of example, the liquid is cooled, after the completion of coagulation, to a temperature of not higher than 40° C., followed by moderate agitation to facilitate separation of the coagulum from the serum, and then subjected to filtration. It is desirous that the separated coagulum is washed to remove the adhering serum and acid therefrom. Preferably, washing is carried out using cold water or a cold aqueous solution of feeble alkali until the pH value of the washing water reaches a value of not lower than pH 6.0. Since the coagulum tends to be suspended in water to flow out if it is washed under vigorous agitation, washing operation should be carried out under a moderate condition. The coagulum may be washed without decreasing the yield by a method wherein the coagulum is put into a vessel, added with cold water of 5° to 10° C., moderately stirred, and then filtered again. In case where a milk protein product having a higher purity is desired, the washed coagulum is suspended again in water and homogenized by a homogenizer to prepare a suspension of fine particles, which is again processed through the aforementioned steps to coagulate the protein at a pH-temperature area surrounded by the lines A, B, C, D, E and F in FIG. 1, followed by separation of the coagulum. The thus obtained coagulum contains substantially no serum, and is different from a curd containing serum, accordingly.

The thus obtained milk protein product may be dehydrated and stored. It may be stored as a high moisture food (Water Content: 60 to 80 wt%) while being chilled or frozen, or may be stored at the room temperature as an intermediate moisture food (Water Content: 10 to 30 wt%) or low moisture food (Water Content: less than 10 wt%). The high moisture food product containing 60 to 80 wt% of water may be prepared simply by pressing the coagulum contained in a nylon pouch to squeeze water out of the coagulum. The intermediate and low moisture food products may be prepared by dehydrating in a conventional hot air dryer, spray dryer or freeze dryer.

In order to prevent deterioration during the drying step, a known stabilizer for proteins may be added if necessary. Examples of the stabilizer include inorganic salts such as polyphosphate, organic salts such as sodium citrate, carbohydrates such as glucose and dextrin, polyalcohols such as sorbitol, and surfactants such as glycerin fatty acid esters.

The milk protein product, obtained by the present invention, has extremely high water-dispersing and hydrophilic properties and contains substantially no serum. Although the mechanism for the provision of such characteristics has not been made clear, it is considered that the product of the invention is formed by monomolecular reaction in view of the fact that the coagulation line is substantially linear as shown by the lines a, b, c - - - in FIG. 2. More specifically, it is considered that calcium atoms are first removed from casein micelles of the flowing milk by the action of hydrogen ions, whereupon stable micell structure is broken to initiate coagulation, and that strong isoionic coagulation or hydrophobic bonding is not formed since the protein has more negative charge than that in case of the isoionic coagulation, resulting in formation of coagulum having high water-dispersible and hydrophilic properties. The milk protein product, according to this invention, has the characteristics which are not provided by the conventional products. A coagulum containing fat is obtained, according to the invention, when a starting material containing fat, such as milk (Fat Content: 3.0 to 4.5 wt%) or low-fat milk, is used. The thus obtained coagulum is hydrophilic and excellent in water-dispersibility, and yet soft and cohesive to have an extendability adapted for use as a material for novel foodstuffs. For example, fresh cheese is not cohesive until it is aged for a long time to be changed to cohesive cheese under the action of enzyme. On the contrary, the coagulum containing fat is cohesive similar to aged cheese.

The milk protein product of the present invention is excellent in water-dispersible and hydrophilic properties, has no off flavor due to alkali, and contains little lactose. It is thus expected that the milk protein product of the invention may be used for wide applications. It may be used as materials for tube and orally administered liquid diets, nutritional high protein foods, lactose tolerance milk products and adhesives used in meat products including ham and sausage or used in processed marine products including boiled fishpaste.

EXAMPLES OF THE INVENTION

The present invention will now be described with reference to examples thereof. It is noted hereby that the following examples are illustrated by way of example only and it is not intended to limit the present invention by the following examples.

EXAMPLE 1

Fresh milk was defatted by centrifugal separation to obtain 10 l of skim milk (containing 8.5 wt% of solid skim milk). A 2 w/w% aqueous lactic acid solution was dropwisely added to the skim milk to adjust the pH value thereof to pH 5.43. After the pH value of the raw material liquid had been stabilized, the raw material liquid was flowed using a pump at a flow rate of about 10 cm/sec through a warm water heat exchanger to heat the liquid indirectly to 60° C., whereupon coagulum was formed partially. The temperature of the liquid was further raised to 62° C. at which the milky liquid vanished to complete coagulation. Heating was stopped at that temperature, and the liquid was held at that temperature for about 10 minutes and then cooled to 35° C. by introducing cold water into the outer vessel. The liquid was poured into a 100 mesh nylon net pouch to separate the coagulum. The coagulum contained in the pouch is pressed to remove serum, and the pressed mass was put into a vessel and crushed lightly by a bar, and added with cold water of 5° C. and agitated moderately. The thus formed suspension was poured again into the nylon pouch and pressed. The step of washing with cold water was repeated for three times until the pH value of the washing water reached to a value of higher than 6.0. The amount of the protein product was 945 g, and the moisture content thereof was 70.2 wt%. 10 g of the mass containing water was added with 200 ml of distilled water, homogenized and then allowed to stand at 5° C. for two days. The homogenized suspension was kept milky in its entirely after the lapse of two days, and no solid precipitate was found. This result revealed that the product was excellent in water-dispersing and hydrophilic properties.

For comparison, the same processing was repeated except in that the flow rate was decreased to about 1 cm/sec to obtain a coagulum. The following procedure was the same as aforementioned. The result was that a little sediment was observed to reveal that the coagulum had somewhat inferior water-dispersible and hydrophilic properties. A further coagulum sample obtained by increasing the flow rate to 2 cm/sec was subjected to the same suspension test. The result was that no sediment was observed.

The same raw material liquid was processed similarly except in that coagulation was effected under a static condition, whereby the milk was solidified to form a custard like mass which was scarcely dispersed in distilled water. Separately, for the comparison purpose, an acid casein product was prepared from the same raw material liquid. 7 g of the acid casein product containing water (Water Content: 58.0 wt%) was suspended in distilled water, followed by homogenization, and allowed to stand for two days. The result was that the suspension was clearly separated into a supernatant layer and a solid protein precipitate layer. The result of the acid casein product showed clear difference in water-dispersible property.

EXAMPLE 2

800 g of a commercially available skim milk powder was put into 10 l of distilled water of 60° C., and suspended therein using a homogenizer. The suspension was filtered through a nylon cloth to remove unsuspended material. After cooling, the suspension was flowed at a flow rate of about 100 cm/sec using a pump and added with a 0.15 Normal hydrochloric acid to adjust the pH value thereof to pH 5.63. The suspension was held under that condition for about 60 minutes to stabilize the pH value thereof. Thereafter, the suspension was flowed at a flow rate of about 100 cm/sec and heated similarly as in Example 1. Serum was partially separated at 51° C., and the initial milky liquid completely vanished as the temperature of the liquid was raised to 53° C. with the formation of yellow serum throughout the liquid and with the formation of coagulum. Heating was stopped at 53° C., and the liquid was held still at that temperature for about 30 minutes, whereby the coagulum settled to the bottom of the container. After cooling the liquid to 30° C., the liquid was passed through a 200 mesh stainless steel sieve to remove the serum. The coagulum was then washed with 5 l of cold water of 5° C., then with 3 l of a 1% aqueous sodium bicarbonate solution of 5° C., and further with 5 l of cold water of 5° C. The washed coagulum was put into a 100 mesh nylon pouch and dehydrated by pressing to obtain 795 g (Water Content: 66.5%) of a protein product. A portion of the protein product was picked up and suspended in distilled water, generally following to the procedure described in Example 1, to examine the dispersibility thereof in water. An acid casein product was prepared from the same starting material by the process as described in Example 1, and the dispersibility thereof in water was examined. The result was that the milk protein product of the invention provided a suspension which was milky in its entirety after the lapse of two days with substantially no solid precipitate. On the other hand, the acid casein product was precipitated completely to form a solid precipitate which was separated from a clear supernatant.

EXAMPLE 3

10 l of the skim milk as used in Example 1 was put into a 20 l volume container, and heated to 50° C. While maintaining the temperature of the skim milk at 50° C., the skim milk was agitated (Average Flow Rate: about 100 cm/sec) using an agitator and added with a 0.15 Normal aqueous hydrochloric acid solution. The acid solution was injected through a metering pump into the portion, at the vicinity of the agitator, flowing at the highest flow rate. The change in pH value was continuously measured. Coagulum was found in some portions of the liquid as the pH value reached 5.45. Addition of acid was continued until the pH value reached 5.40 at which coagulation was completed. Addition of acid was stopped at that time point. The liquid was allowed to stand still for 30 minutes, and the pH value of the liquid was measured again to find that the pH value was changed to 5.45. The pH value was measured using an automatic temperature compensated pH meter for indicating the pH value at 25° C.

The coagulated protein was separated similarly as in Example 1. The thus obtained milk protein product was subjected to similar test as conducted in Example 1, whereby a similar result was obtained. The milk protein product was freeze-dried and the chemical composition thereof was examined to obtain the following result (the result being shown in percentage by weight in 100 g of the freeze-dry product):

Water: 5.00, Nitrogen: 14.05, Fat: 0.60, Ash: 4.10

EXAMPLE 4

10 l of the same skim milk as used in Example 1 was added slowly with a 0.2 Normal aqueous hydrochloric acid solution under the same agitation condition as described in Example 3, as the first acid addition step, to adjust the pH value to 5.95. Then, using a warm heat exchanger, the temperature of the skim milk was raised to 66° C. While maintaining the temperature of the skim milk at 66° C. under continuous agitation, the second step acid addition was carried out using a 0.20 Normal aqueous citric acid solution. As the pH value reached 5.64, coagulum was formed at some portions of the liquid. Addition of the acid solution was continued until the pH value reached 5.60 at which coagulum was formed throughout the liquid. Addition of the acid solution was stopped at that time point. The pH value of the liquid was stabilized after additional 20 minutes. The pH value of the liquid at a high temperature was measured using an automatic temperature compensated pH meter, so that the pH value was indicated by a value at 25° C. The following procedures were similar to Example 1, whereby a milk protein product of the invention was obtained. The milk protein product was subjected to a similar test as in Example 1 to obtain a similar result.

EXAMPLE 5

1 l of fresh milk was added with a 2% aqueous tartaric acid solution to adjust the pH value thereof to 5.25. While flowing the liquid at a flow rate of about 50 cm/sec, the temperature of the liquid was raised to 58° C., whereby a coagulum containing fat and having soft adhesive property was obtained.

The coagulum was filtered through a cotton cloth to remove serum, washed and then pressed to squeeze liquid sufficiently. The coagulum was added with 500 ml of distilled water, and further added with 5 g of lecitin, 1.5 g of glyceryl monostearate, 10 g of glucose and 15 g of dextrin (DE 11) under agitation. The pH value of the liquid was adjusted to 6.4 by adding sodium bicarbonate, and then the volume of the liquid was adjusted to 950 ml. Using a homogenizer, the liquid was homogenized at 180 kg/cm$^2$ to obtain a drink containing 2.9 wt% of protein, 3.1 wt% of fat, 0.3 wt% of lactose and 0.15 wt% of ash. The thus obtained drink was a low lactose milk drink of light taste, which could be taken by a person who is intolerable to lactose. The milk protein constituent was not precipitated even after the drink was allowed to stand for one week.

EXAMPLE 6

10 l of the same skim milk as used in Example 1 was added slowly with a 0.15 Normal aqueous hydrochloric acid solution to adjust the pH value to 5.70, as the first acid addition step. Then, a 0.15 Normal aqueous citric acid solution was added to adjust the pH value of the liquid to 5.50. The liquid was heated to 63° C. while agitating the liquid using an agitator provide with propellers to flow the liquid at an average flow rate of 300 cm/sec, whereupon coagulation occurred. The coagulum was separated by centrifugal separation (4500 G) and the thus separated coagulum was added with about five times volume of distilled water and agitated moderately. The thus formed suspension of the coagulum was subjected again to centrifugal separation to collect the coagulum. The coagulum was added to normal milk (Content of Milk Protein: 3.0 w/w%) in an amount of 2 w/w% as a dried milk protein product, and then homogenized. No precipitate was found after the homogenized product was stored for one week. Stable high protein milk was thus prepared by this Example.

EXAMPLE 7

1 l of fresh milk was sterilized by heating the same at 70° C. for one minute and then cooled to 42° C. The sterilized milk was then inoculated with 20 g of a yogurt starter (a mixture of L. bulgaricus IFO 13953 and S. thermophilus IFO 13957) and cultured at 41° C. for 2.5 hours to obtain cultured milk having a pH value of 5.45. The cultured milk was flowed at a flow rate of about 50 cm/sec using a pump, and heated to 65° C. using a warm water heat exchanger, whereby a coagulum was formed. The coagulum was filtered through a cotton cloth, washed with cold water, and pressed lightly to remove liquid. 270 g (Water Content: 78%) of a cohesive coagulum of fat-containing protein was obtained. The product was resembling fresh cheese and had extendability.

EXAMPLE 8

1 l of fresh skim milk was sterilized by heating the same at 70° C. for one minute and then cooled to 37° C. The sterilized skim milk was then inoculated with 20 g of a yogurt starter (S. lactic IFO 12546) and cultured at 33° C. for 40 hours to obtain cultured skim milk having a pH value of 5.55. The cultured skim milk was flowed at a flow rate of about 100 cm/sec using a pump, and heated to 63° C. using a warm water heat exchanger, whereby a coagulum was formed. The coagulum was cooled immediately and filtered through a 200 mesh nylon cloth, washed with cold water, and pressed lightly to remove liquid. 105 g (Water Content: 71%) of a cohesive milk protein product was obtained. The product was cohesive and resembling fresh cheese and had a good taste, and was tackier than cottage cheese and superior in spreading property.

EXAMPLE 9

900 g of the milk protein product prepared in Example 1 and having a water content of 76.2 wt% was added with 1000 g of water and 3.5 g of sodium phosphate (Na$_3$PO$_4$) under agitation to adjust the pH value of the liquid to 6.10. The liquid was processed through a spray drying process to obtain a milk protein product powder having a moisture content of 4 wt%. Three kinds of sausage were produced, as shown in Table 1, from pork, pork added with the dispersible milk protein powder obtained by the aforementioned process and pork added with the sodium caseinate. The texture and the water holding property of each sausage were determined by the following methods. The texture was determined by the Szczesniak method using a texture test instrument (produced and sold by General Foods Technical Center under the Trade Name of "Texturometer"), and the water holding property was determined by subjecting each sausage to centrifugal separation at 1000 rpm for 3 minutes and measuring the water content held after the centrifugal separation. The results are shown in Table 2. It should be appreciated from the results shown in Table 2 that the milk protein product of the invention is superior over the conventional sodium caseinate when used as an additive in the preparation of sauage.

TABLE 1

| No. | Kind of Added Protein | Amount of Added Protein (g) | Pork (g) | NaCl (g) | NaNO$_2$ | Cold Water (g) |
| --- | --- | --- | --- | --- | --- | --- |
| 1 | None (Control) | — | 100 | 2.2 | trace | 10 |
| 2 | Sodium Caseinate | 5 | 80 | 2.2 | trace | 25 |
| 3 | Dispersible Milk Protein | 5 | 80 | 2.2 | trace | 25 |

TABLE 2

| No. | Hardness (kg/cm$^2$) | Cohesiveness (cm$^2$/cm$^2$) | Elasticity (%) | Adhesiveness (cm$^2$/cm$^2$) | Water Holding Property (wt %) |
| --- | --- | --- | --- | --- | --- |
| 1 | 2.7 | 0.59 | 62.5 | 0.45 | 87.7 |
| 2 | 1.1 | 0.27 | 25.6 | 0 | 71.9 |
| 3 | 2.2 | 0.53 | 62.5 | 0.60 | 89.0 |

EXAMPLE 10

The following separated milk protein products were prepared:

(1) Moisture-containing milk protein product prepared by Example 1;

(2) Moisture-containing milk protein product prepared by Example 2;

(3) Moisture-containing milk protein product prepared by Example 3;

(4) Moisture-containing milk protein product prepared by Example 7;

(5) Moisture-containing acid casein prepared from the same skim milk as used in Example 1 through a conventional process (using lactic acid, adjusting the pH value to 4.5 and heating at 40° C.);

(6) Moisture-containing rennet casein prepared from the same skim milk as used in Example 1 through a conventional process wherein the skim milk is cultured by the addition of rennin;

(7) Moisture-containing high calcium co-precipitate prepared through a conventional process wherein the same skim milk was added with 0.2 w/w% of CaCl$_2$ and heated at 90° C. for one minute; and (8) Moisture-containing low calcium co-precipitate prepared through a conventional process wherein the same skim milk was added with 0.03 w/w% of CaCl$_2$ and heated at 90° C. for 15 minutes.

45 g (calculated as a moisture-free solid) for each of the protein products was added with distilled water so that the total weight of the mixture was 300 g (the solid content of the mixture being 15 wt%), and mixed intimately. After storing the mixtures for an hour, the viscosities of respective mixtures were measured using a rotating viscometer (Couett type). It was judged that the mixtures having higher viscosities contained proteins which were higher in hydrophilic properties.

Separately, 4.5 g (calculated as a moisture-free solid) for each of the protein products was added with distilled water so that the total weight of the mixture was 300 g (the solid content of the mixture being 1.5 wt%), and then homogenized by processing the mixture for 5 minutes (at 50 Hz, 60 volts) in an ultra agitator (Type F450Ex., produced by Flux-Geraete GmbH, West Germany). The homogenized mixture was then allowed to stand still at 5° C. After the lapse of 24 hours, 5 ml of the mixture was taken from a portion in the test tube at substantially the half height of the liquid level. A portion of the liquid sample thus taken from the test tube was used for the determination of L value of white turbidity by the reflected light measuring method using a color-difference meter (Type ADU-CH-I, produced by Suga Shikenki K.K.) having an inspection hole diameter of 30 mm$\phi$ to measure the reflected light at 30 mm in a liquid. The residual portion of the liquid sample was diluted by 10 times with water, and the light absorbance (OD value) at 600 m$\mu$ of the diluted sample liquid was measured. It was judged that the mixtures having higher L values and higher light absorbance contained proteins which had higher dispersibility in water. The residual portion of each mixture contained in the test tube was gently decanted to separate the upper supernatant suspension containing no precipitate from the lower precipitate. The nitrogen contents of both of the supernatant suspension and the precipitate were measured, and the dispersibility in water of each milk protein product was calculated from the following equation:

$$\frac{\text{Total Nitrogen (\%) in the Supernatant}}{\text{Total Nitrogen (\%) in the Whole Mixture}} \times 100$$

All of the aforementioned measuring tests were conducted for two times, and the results were averaged.

As will be apparent from the results shown in Table 3, the milk protein products of the invention formed suspensions having high viscosites to reaveal that they were excellent in hydrophilic property, and they formed milky suspensions which were stable for a long time to reveal that they had excellent dispersibility in water.

TABLE 3

| | Hydrophilic Property | Dispersibility in Water (1.5 w/w %) | | |
| --- | --- | --- | --- | --- |
| Milk Protein Product | Viscosity 15 w/w %, at 20° C. (cP) | Light Absorbance (OD) of the Supernatant ($\times$ 1/10) at 600 m$\mu$ | L Value of White Turbidity of the Supernatant | Water-Dispersibility at pH 6.6 (%) |
| 1 Example 1 | 36,500 | 0.733 | 49.6 | 97.8 |
| 2 Example 2 | 29,300 | 0.683 | 48.5 | 96.3 |
| 3 Example 3 | 34,700 | 0.689 | 45.9 | 95.5 |
| 4 Example 7 | 31,100 | 0.690 | 47.2 | 95.8 |

TABLE 3-continued

| Milk Protein Product | Hydrophilic Property Viscosity 15 w/w %, at 20° C. (cP) | Dispersibility in Water (1.5 w/w %) | | |
|---|---|---|---|---|
| | | Light Absorbance (OD) of the Supernatant (× 1/10) at 600 mµ | L Value of White Turbidity of the Supernatant | Water-Dispersibility at pH 6.6 (%) |
| 5 Acid Casein | 6,500 | 0.080 | 33.7 | 25.0 |
| 6 Rennet Casein | 1,800 | 0.021 | 20.1 | 12.0 |
| 7 High Calcium Co-precipitate | 3,000 | 0.080 | 27.9 | 18.0 |
| 8 Low Calcium Co-precipitate | 6,000 | 0.048 | 22.6 | 15.0 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A milk protein product having water-dispersible and hydrophilic properties and containing substantially no serum, said milk protein product being obtained by a process comprising the steps of:

(a) coagulating milk under a flowing condition and at a pH ranging from 5.10 to 6.10 and temperatures ranging from 38 to 86 degrees C., wherein the temperature y and the pH x vary together, from $x=5.10$ to $x=(y+247)/52.3$ as y varies from 38 to 62 degrees C., from $x=(y+244)/60$ to $x=(y+247)/52.3$ as y varies from 62 to 72.03 degrees C., and from $x=(y+244)/60$ to $x=6.10$ as y varies from 72.03 to 86 degrees C., to thus obtain a coagulum; and (b) separating said coagulum.

2. A milk protein product according to claim 1, wherein said milk is flowed at a flow rate of at least not less than 2 cm/sec.

3. A milk protein product according to claim 1, wherein said milk is selected from the group consisting of milks containing fat, skim milks including partially defatted skim milk and sufficiently defatted skim milk and reconstituted milks.

4. A milk protein product according to claim 1, wherein the concentration of said milk ranges from 3 to 15 w/w% as calculated as a solid non-fat content.

5. A milk protein product according to claim 1, wherein an aqueous solution of an acid is added to adjust said pH value.

6. A milk protein product according to claim 5, wherein said acid is selected from the group consisting of acetic acid, citric acid, lactic acid, adipic acid, tartaric acid, malic acid, fumaric acid, gluconic acid, ethylenediaminetetraacetic acid, phosphoric acid, hydrochloric acid, sulfuric acid, glucono-δ-lactone and salts thereof.

7. A milk protein product according to claim 1, wherein said pH value is adjusted by the cultivation of microorganism.

8. A milk protein product according to claim 7, wherein said microorganism is lactic acid bacteria.

9. A milk protein product according to claim 1, wherein said milk is heated, and then the pH value is ajusted to bring said milk within said pH-temperature area.

10. A milk protein product according to claim 1, wherein said pH value is adjusted, and then said milk is heated to bring said milk within said pH-temperature area.

11. A milk protein product according to claim 1, wherein said pH value is adjusted simultaneously with heating said milk to bring the milk within said pH-temperature area.

12. A milk protein product according to calim 1, wherein said milk is cooled to a temperature of not higher than 40° C. to be coagulated.

13. A milk protein product according to claim, wherein said process further comprises a washing step effected after said separating step (b).

14. A milk protein product according to claim 13, wherein said washing step is effected by the use of a washing liquid selected from the group consisting of water and feeble aqueous alkali until the pH value of the washing liquid reaches to a value of not less than 6.0.

15. A milk protein product according to claim 13, wherein said process further comprises a dehydration step effected after said washing step.

16. A milk protein product according to claim 1, further comprises a stabilizer for said protein product.

17. A milk protein product according to claim 16, wherein said stabilizer for said protein product is selected from the group consisting of polyphosphate, sodium citrate, glucose, dextrin, sorbitol, glycerin fatty acid ester and mixtures thereof.

* * * * *